United States Patent
Little, II et al.

(10) Patent No.: US 7,406,503 B1
(45) Date of Patent: Jul. 29, 2008

(54) DICTIONARY ATTACK E-MAIL IDENTIFICATION

(75) Inventors: Charles Reeves Little, II, San Jose, CA (US); Eric L. Eilebrecht, San Francisco, CA (US)

(73) Assignee: Microsoft Corporation, Redmond, WA (US)

( * ) Notice: Subject to any disclaimer, the term of this patent is extended or adjusted under 35 U.S.C. 154(b) by 996 days.

(21) Appl. No.: 10/651,316

(22) Filed: Aug. 28, 2003

(51) Int. Cl.
*G06F 15/16* (2006.01)
(52) U.S. Cl. ...................................... 709/206
(58) Field of Classification Search ................ 709/206, 709/207
See application file for complete search history.

(56) References Cited

U.S. PATENT DOCUMENTS

| | | | | |
|---|---|---|---|---|
| 4,490,811 A | * | 12/1984 | Yianilos et al. ................ | 707/5 |
| 5,987,797 A | * | 11/1999 | Dustin ........................ | 42/75.02 |
| 5,996,011 A | * | 11/1999 | Humes ........................ | 709/225 |
| 6,643,686 B1 | * | 11/2003 | Hall ............................ | 709/206 |
| 6,654,787 B1 | * | 11/2003 | Aronson et al. ............. | 709/206 |
| 6,768,991 B2 | * | 7/2004 | Hearnden ...................... | 707/5 |
| 6,952,719 B1 | * | 10/2005 | Harris ......................... | 709/206 |
| 7,016,939 B1 | * | 3/2006 | Rothwell et al. ............. | 709/206 |
| 7,092,992 B1 | * | 8/2006 | Yu .............................. | 709/206 |
| 2002/0199095 A1 | * | 12/2002 | Bandini et al. .............. | 713/151 |
| 2003/0149729 A1 | * | 8/2003 | Burgard et al. ............. | 709/206 |
| 2003/0187942 A1 | * | 10/2003 | Quine et al. ................ | 709/207 |
| 2004/0093384 A1 | * | 5/2004 | Shipp ......................... | 709/206 |
| 2004/0260776 A1 | * | 12/2004 | Starbuck et al. ............ | 709/206 |
| 2005/0015454 A1 | * | 1/2005 | Goodman et al. ........... | 709/207 |

* cited by examiner

*Primary Examiner*—Andrew Caldwell
*Assistant Examiner*—John M Frink
(74) *Attorney, Agent, or Firm*—Lee & Hayes, PLLC

(57) ABSTRACT

User IDs in addresses to which an e-mail is addressed are logically ordered into a 2D matrix of rows each having one user ID. For each column in the 2D matrix, a column count is found by counting the highest number of matching characters in the column. A column quotient is calculated for each column by dividing the column count by the total number of rows in the 2D matrix. A weighted column quotient is calculated for each column by multiplying the column quotient by a weight that is based on the left-to-right order of the column in the 2D matrix. A numerical assessment is made of the similarity of the user IDs in the addresses to which the e-mail is addressed by adding up the weighted column quotients for the columns in the 2D matrix.

58 Claims, 4 Drawing Sheets

DICTIONARY ATTACK E-MAIL IDENTIFICATION

TECHNICAL FIELD

This invention is directed towards electronic mail (e-mail) and more particularly relates to the detection of unwanted e-mail.

BACKGROUND

Electronic mail (e-mail) that is not requested is commonly referred to as 'spam', but is also known as "unsolicited commercial e-mail" (UCE), "unsolicited bulk e-mail" (UBE), "gray mail", and the electronic equivalent of "junk mail". The term spam can be used as both a noun (the e-mail message) and as a verb (to send it), respectively characterizing mail practically no one wants and the mailing of the same. Spam is used to advertise products and services, request charitable donations, or to broadcast some political or social commentary. Spamming is the practice of sending the same message by e-mail to large numbers of e-mail addresses indiscriminately. Spamming is considered bad manners in this digital world and unethical because it not only wastes everyone's time, but also costs money. The sender of the messages (the 'spammer') does not pay the cost. Rather, the cost is paid by the Web sites of the recipient and others on the route. Spam also eats up network bandwidth.

Like viruses, spam has become a scourge on the Internet as hundreds of millions of unwanted messages are transmitted daily to almost every e-mail recipient as well as to newsgroups. Unfortunately for users and fortunately for spammers, as an advertising medium, spam does produce results. Even if only an infinitesimal number of users reply, it is still cost effective since e-mail is a very inexpensive way to reach people.

There are many organizations, as well as individuals, who have taken it upon themselves to fight spam with a variety of techniques. In order to alleviate some spam, Internet Service Providers (ISPs) and other e-mail service providers have added servers that do spam filtering to divert incoming spam. Spam filters can be installed in the user's machine and/or in the mail server, in which case, the user never receives the spam. Spam filtering can be configured to trap messages based on a variety of criteria, including the sender's e-mail address, specific words in the subject or message body or by the type of attachment that accompanies the message. Address lists of habitual spammers (blacklists) are maintained by various organizations, ISPs and individuals as well as lists of acceptable addresses (whitelists) that might be misconstrued as spam. Spam filters reject blacklisted messages and accept whitelisted ones. Sophisticated spam filters use artificial intelligence techniques that look for key words and attempt to decipher their meaning in sentences in order to more effectively analyze the content and not reject for non-delivery a real message. Spam filters can also divert mail that comes addressed as "Undisclosed Recipients," instead of having the e-mail address spelled out in the "to" or "cc" field.

Despite the user's best of efforts as well as those of the e-mail service provider that services the user, spam filtering is not always successful in that spam still finds its way to the user's e-mail address. In fact, because the Internet is public, no e-mail service provider can guarantee that its users will be prevented from receiving spam, just as it is nearly impossible for a governmental postal service to prevent the delivery of junk mail to addressees.

A significant and effective spamming technique known to spammers is a dictionary attack-based mass mailing of e-mails. To do this, the spammer creates or generates a list of different addresses that are derived from a dictionary of common words, phrases, and character sequences. As a result, the list will have many addresses that can be quite similar. For instance, the spammer may use such a dictionary to derive different combinations of user identifications (IDs). The user IDs, so derived, are consequently quite similar. The spammer, however, does not know in advance whether or not any of the addresses in the derived list are valid e-mail addresses. Nevertheless, the spammer sends the spam to the addresses corresponding to the different combinations of user IDs in the hope that a high percentage of the e-mail addresses will be valid e-mail addresses.

Dictionary attack-based mass mailing of e-mails exacts a high cost by wasting the time of the spam recipients and by sapping expensive resources away from e-mail service providers. It would be an advantage in the art to prevent the delivery of dictionary attack-based mass mailing of e-mails.

SUMMARY

An implementation of the invention checks a list of addresses to which an e-mail is addressed and determines a spam rating or value that assesses the degree to which the addresses are similar. The spam value is function of the number of common letters in the e-mail addresses or in the user IDs of the e-mail addresses. Preferably, the spam value will be designed to not be thrown off by the addition of one or a few random dissimilar addresses.

In one implementation, the assessment of the spam rating parses each e-mail address up to the '@' character to obtain the user ID of the e-mail address. The user IDs are read into a two dimensional (2D) matrix, the columns of which can be used to compare the highest number of common letters in each column. The highest number of repeated letters in the user IDs of each column is divided by the total number of rows in the 2D matrix and multiplied by a weight based on the location of the column in the matrix to arrive at a weighted column value. The respective weighted column values for each column are summed to obtain the spam rating for the addresses to which the e-mail is addressed.

In another implementation, the spam value can be weighted by a weight value for a dictionary attack-based mass mailing of e-mails, and the weighted spam value can then be combined with other appropriately weighted spam ratings that use respective algorithms to assess the likelihood that the e-mail is spam. A decision can them be made as to whether the e-mail should be delivered to the one or more addresses to which the e-mail is addressed.

BRIEF DESCRIPTION OF THE DRAWINGS

A more complete understanding of the implementations may be had by reference to the following detailed description when taken in conjunction with the accompanying drawings wherein.

Figure 1:
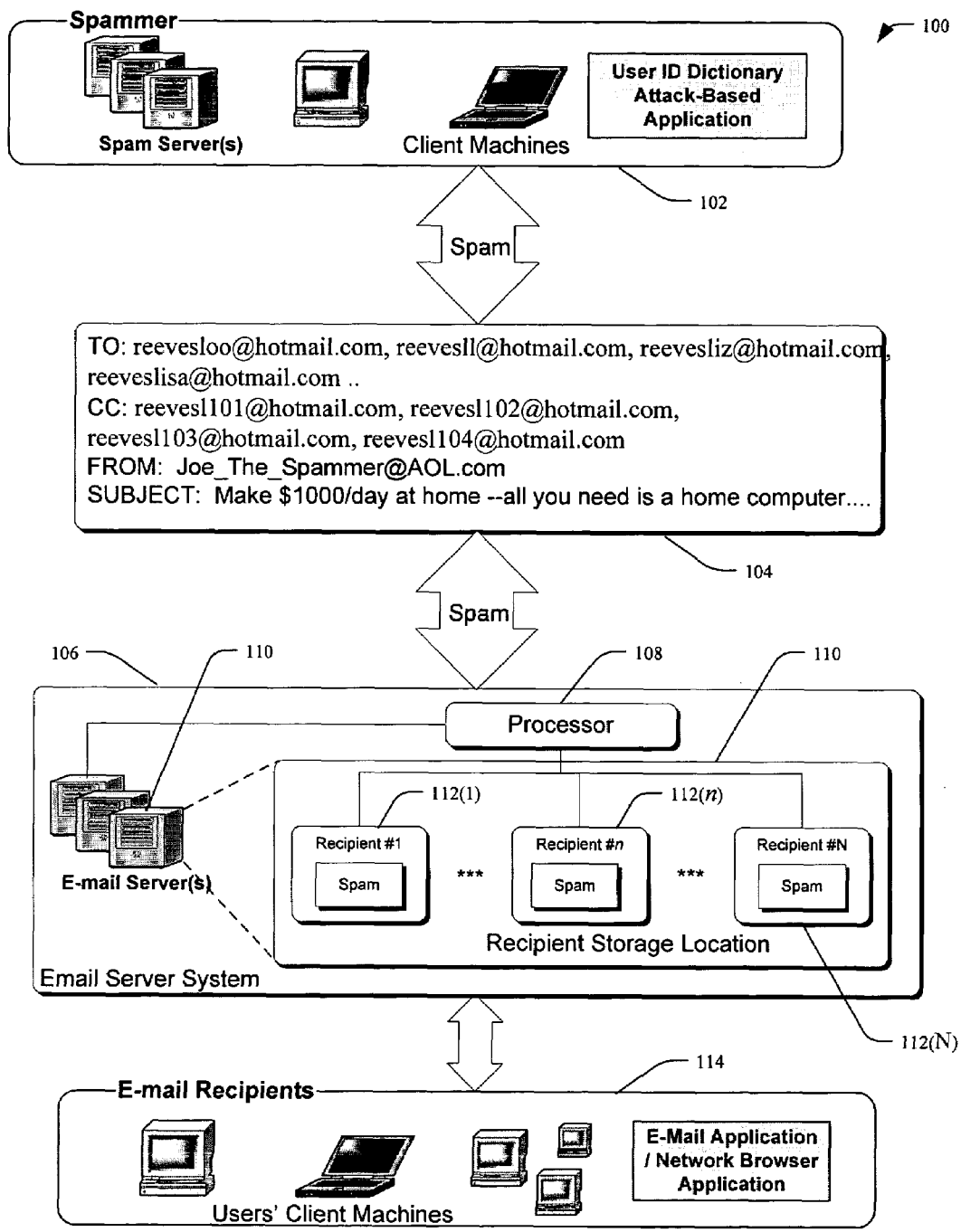
FIG. 1 depicts an exemplary environment having components for implementations in which client machines communicate using an e-mail application and/or network browser to obtain e-mail from an E-mail service provider, where the E-mail service provider receives spam from a spammer.

The same numbers are used throughout the disclosure and figures to reference like components and features. Series 100 numbers refer to features originally found in FIG. 1, series 200 numbers refer to features originally found in FIG. 2, series 300 numbers refer to features originally found in FIG. 3, and so on.

DETAILED DESCRIPTION

The present invention is directed towards the identification of a dictionary attack e-mail. When similar user IDs are found in multiple e-mail addresses to which an e-mail is sent, one might suspect that that the e-mail is spam from a dictionary attack-based mass mailing of e-mails. E-mail addresses have a standard string segmentation. The user ID is found prior to a leftmost '@' character. The '@' character is followed by a string of characters which identify the server on the Internet to which the e-mail should be routed (e.g., 'hotmail.com').

By way of example of the foregoing, a user having an e-mail address that is "reevesloo@hotmail.com" could receive an e-mail that is addressed in a "TO" field to the following addresses:

"TO:reevesloo@hotmail.com, reevesll@hotmail.com, reevesliz@hotmail.com, reeveslisa@hotmail.com and a copy of the e-mail could also be addressed for sending via a "CC" field to the following addresses:

"CC:reeves1101@hotmail.com, reeves1102@hotmail.com, reeves1103@hotmail.com, reeves1104@hotmail.com".

The similarities between the user identification codes (user IDs) in the e-mail addresses can be seen by the repetition of the order of characters. The similarities are best seen by examining the user ID of each of the e-mail addresses to which the e-mail is addressed. The following Table A shows these similarities as represented in a two dimensional (2D) matrix of rows and columns.

TABLE A

| User Ids | | | | | | | | | | |
|---|---|---|---|---|---|---|---|---|---|---|
| r | e | e | v | e | s | l | o | o | | |
| r | e | e | v | e | s | l | l | | | |
| r | e | e | v | e | s | l | i | z | | |
| r | e | e | v | e | s | l | i | s | a | |
| r | e | e | v | e | s | 1 | 1 | 0 | 1 | |
| r | e | e | v | e | s | 1 | 1 | 0 | 2 | |
| r | e | e | v | e | s | 1 | 1 | 0 | 3 | |
| r | e | e | v | e | s | 1 | 1 | 0 | 4 | |
| 8 | 8 | 8 | 8 | 8 | 8 | 8 | 5 | 4 | 0 | : Total |

Table A can be logically assembled by columnizing the user IDs after obtaining the user ID for each of the addresses by parsing the characters thereof in order from the left-to-right prior to the occurrence of an "@" character. The bottom row of numbers (marked as 'Total') shows the count of the letter with the most occurrences in each of the ten (10) columns. Each total is expressed as a zero (0) if there are no repeated characters in the column, and each total will be greater than or equal to two (2) if there are repeated characters in the column. Each total for each column can be divided by the number of user IDs in the 2D matrix to give a percentage.

The percentages are then summed for all columns. The percentages can be weighted before summing, a discussion of which follows.

User IDs generally are selected by users according to a word or phrase that is understood in a left-to-right sequence. In addition, user IDs that are commonly used (such as "mike-smith") are often distinguished from each other by adding a numerical component or other unique component to the right end of the ID. As such, matching characters in the user ID that are positioned in the lower columns, from left to right, are given more weight than that of the matching characters in the user ID that are positioned in the higher columns. A progressive weighting system can be used to make the matching characters in the user ID positioned in the lower columns more important to the determination of the similarity of user ID, and thus in the assessment of whether the e-mail was sent incident to a dictionary attack e-mail mass mailing. A weighted value W(c) for each column (c) can be determined using the following formula:

$W(c)=\ln((n+(c+1)(e-1))/(n+c(e-1)))$; where the variables in the formula are:

n=the total number of characters in the longest user ID;

c=the column number, where the first column number is zero (0); and e=the Euler number constant (approximately 2.718).

Figure 3:
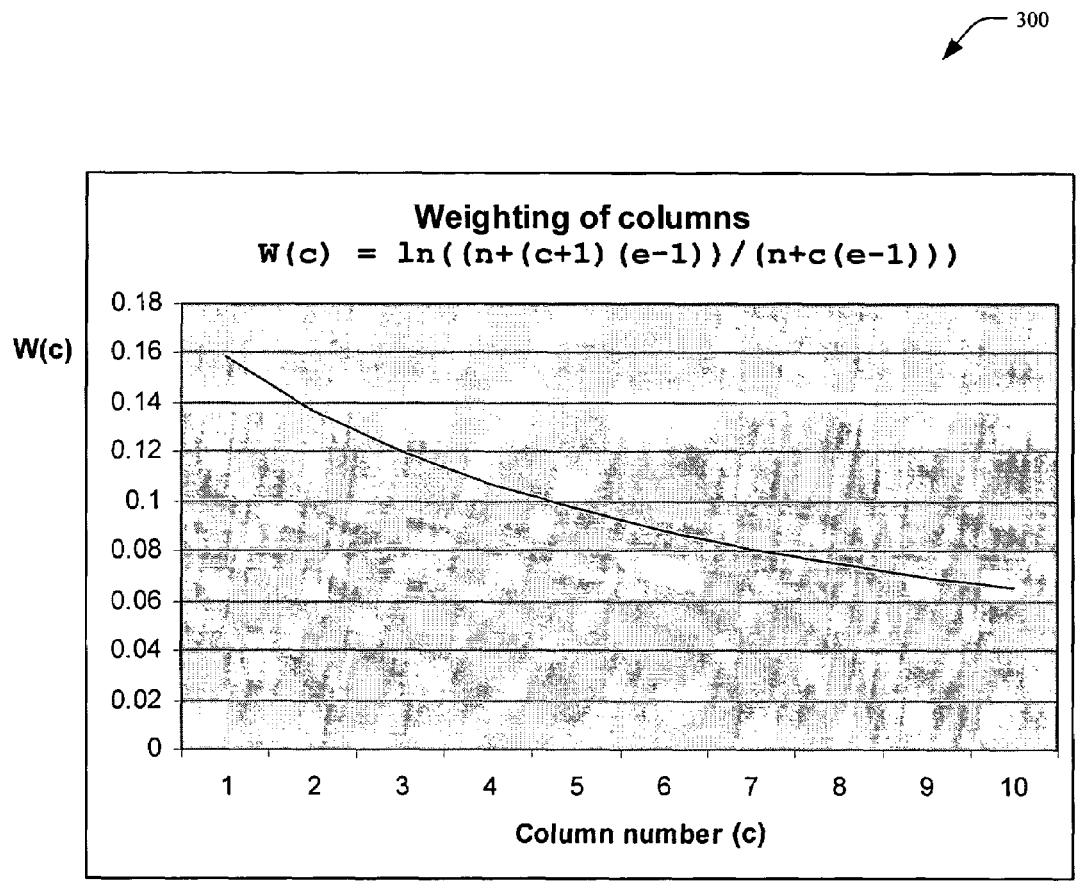
FIG. 3 is a chart plotting column position against column weight as can be used in an implementation for dictionary attack e-mail identification.

A chart plotting the weighted value W(c) for each column (c) is seen in FIG. 3. The function W(c) is derived from the function f(x)=1/x. The area under f(x) between 1 and e in FIG. 3 is equal to 1. If this area is divided into n segments of equal width, numbered from 0 through n−1, then W(c) represents the area under f(x) which falls within the segment numbered c. The sum of the areas of each segment will always be 1. Moreover, the function W(c) is designed such that the sum of W(c) from c=0 to c=(n−1) will be 1. This is true regardless of which e-mail addresses are used. After multiplying the values produced by the function W(c) with the per-column percentages calculated from the matrix discussed above, then the sum of each percentage multiplied by the corresponding weight (W(c)) will equal 1 when all addresses are the same (e.g., when each row in the 2D matrix contains the same user ID and each column contain all the same characters).

The weighted value W(c) for each column (c) can then be multiplied by the percentage of common characters in the column. The resulting weighted percentages for each column can then be totaled for the set. This total can be then be multiplied by another weight that is associated with a dictionary attack assessment to determine a final value. The final value can be considered along with other assessments of the e-mail's potential to be spam in order to arrive at a final assessment as to whether e-mail is to be considered to be a spam e-mail. For instance, another assessment might determine that the e-mail is statistically unlikely to be spam when the total number of characters in the longest user ID is more than a predetermined number, such as 72. Another assessment might determine that the e-mail is statistically unlikely to be spam when a count of the number of addresses is not more than a predetermined amount (e.g., fifty), in that a spammer will likely address spam to the maximum number of e-mail addresses that an e-mail service provider will permit.

An environment 100 is seen in FIG. 1 that can be used to generate a dictionary e-mail attack, to identify the attack, and to prevent the delivery of spam from the attack. A spammer 102 can use one or more spam servers and client machines that execute a user ID dictionary attack-based application. As a result of this execution, a spam e-mail 104 is attempted to be sent by the spammer 102 to each of a plurality of e-mails addresses to which the spam e-mail is addressed. In that the user IDs of the spam e-mail 104 were generated by use of a dictionary e-mail attack algorithm it is likely that may of the resultant e-mail addresses will not be valid e-mail addresses. Nevertheless, an e-mail server system 106 can receive the spam e-mail 104 over a network (as indicated by the large transmission arrows) when an e-mail address in spam e-mail 104 is valid for the e-mail server system 106.

The e-mail server system 106 has a processor 108 and one or more e-mail servers 110 represented by a recipient storage location 110. Applications are executed on processor 108 to deliver e-mail in logically separate locations for e-mail addresses respectively corresponding to recipient 112(1) through recipient 112(N). Each recipient 112(n) has a respective e-mail address that is serviced by e-mail server system 106.

The processor 108 of e-mail server system 106 can also execute one or more applications, such as is embodied in an implementation characterized by a process 200 seen in FIG. 2 and discussed below. These executed one or more applications can be used by e-mail server system 106 to prevent the delivery of dictionary attack e-mail to the locations corresponding to recipient 112(1) through recipient 112(N). As such, e-mail recipients 114 who are the users of the e-mail server system 106 are prevented from seeing and retrieving dictionary attack e-mail when using a client machine. Typically, a client machine is used by each e-mail recipient 114 to execute an e-mail application or a network browser application to see and retrieve e-mail.

Figure 2:
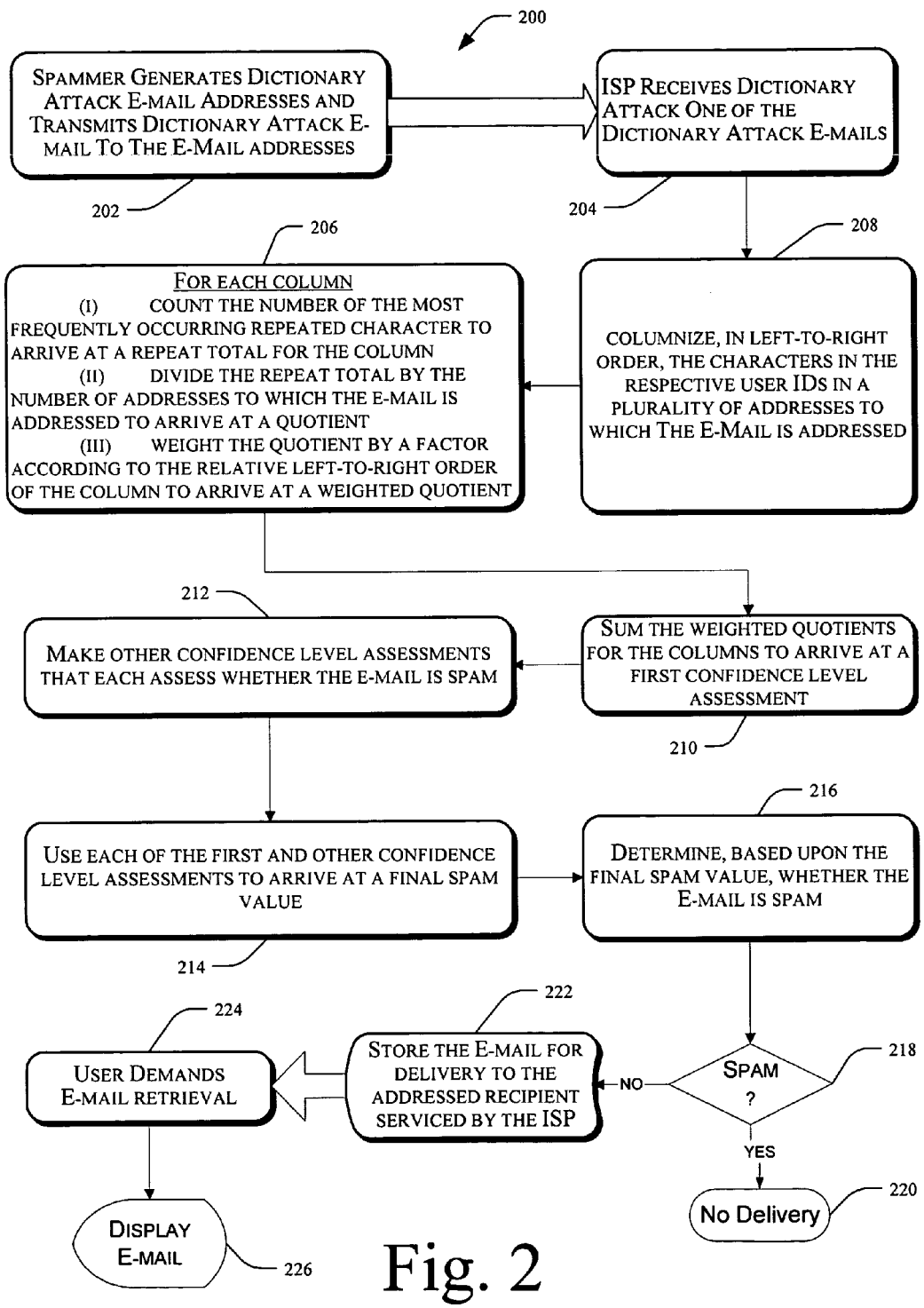
FIG. 2 is a flow diagram, in accordance with an implementation of the invention, of a procedure for detecting a spam e-mail from a dictionary attack, where the procedure can be used in the environment of FIG. 1.

FIG. 2 shows an implementation in which the process 200 than can be performed in the environment 100 of FIG. 1. A spammer, such as spammer 102, generates dictionary attack e-mail addresses at block 202 and then transmits an e-mail that is addressed to a plurality of the generated e-mail addresses. The spammer continues to send e-mails until each of the generated e-mail addresses has been sent in at least one (1) e-mail. An e-mail service provider might get only a portion of the millions of e-mails that a spammer sends out incident to an dictionary e-mail attack. By way of example, a spammer sends out three (3) million e-mails from an address list that includes DSmith@msn.com, DSmith@microsoft.com, DSmith@hotmail.com, * * *, DSmith999999@msn.com, DSmith999999@microsoft.com, and DSmith999999@hotmail.com. The e-mail service provider 'hotmail' would only get those e-mails that (i) are addressed to hotmail, and (2) have a valid e-mail address. The e-mail that hotmail does end up getting will likely be addressed to the maximum number for addresses permitted by hotmail. The spammer sends each e-mail with the maximum number of addresses so that less e-mails can be sent and yet the spammer can still sent e-mails to all of the addresses in the entire dictionary attack list. In other words, each e-mail will be addressed to the maximum number of addresses that a e-mail service provider permits any e-mail to be addressed. The spammer's motivation for doing this might be the cost to send out each e-mail, so money is the spammer's motivation for having the maximum addresses allowed in each e-mail. For instance, each e-mail might contains fifty (50) different e-mail addresses including twenty-five (25) e-mail addresses in a "To" field and twenty-five (25) e-mail addresses in a "cc:" field, where hotmail allows an e-mail to be addressed to a maximum of 25 addresses in each of these fields. In such a case, the e-mail is addressed to the maximum of fifty (50) e-mail addresses.

Hotmail, the Internet Service Provider (ISP), such as E-mail server system 106 seen in FIG. 1, receives the e-mail from spammer 102 at block 204 because the ISP services one or more of the e-mail addresses to which the e-mail is addressed. If the only hotmail address that was valid was DSmith@hotmail, then the ISP hotmail would only receive one (1) e-mail of the three (3) million e-mails. Here, hotmail would have only the fifty (50) e-mail addresses in order to assess whether the e-mail had been sent incident to a dictionary e-mail attack. At block 208 the ISP logically parses out the user ID of each of the addresses and then logically columnizes, in left-to-right order, the characters in the respective user IDs in the addresses to which the E-Mail is addressed.

At block 206, an operation is performed on each column. The operation includes counting the number of the most frequently occurring repeated character to arrive at a repeat total for the column. The operation then divides the repeat total by the number of addresses to which the e-mail is addressed to arrive at a quotient. The operation then weights the quotient by a factor according to the relative left-to-right order of the column to arrive at a weighted quotient.

After the operation, process 200 moves to block 210 where the weighted quotients for the columns are summed to arrive at a first confidence level assessment. For instance, the ISP hotmail may derive a high first confidence level assessment from the fifty (50) e-mail addresses, only one (1) of which was the valid e-mail address of 'DSMith@hotmail.com'. Optionally, other confidence level assessments can be made at block 212, each of which assess, using respectively different algorithms, whether the e-mail is spam. At block 214, process 200 uses each of the first and other confidence level assessments to arrive at a final spam value. At block 216, a statistical determination is made, based upon the final spam value, as to whether the E-mail is spam. A query is made at block 218 as to the statistical determination. If the e-mail is spam, it will be not be delivered and process 200 terminates at block 220. Thus, given the foregoing example, the high first confidence level assessment derived from the fifty (50) e-mail addresses might be combined with still other analysis of the e-mail from which the ISP hotmail might conclude that the e-mail was spam and should therefore be filtered out of the deliveries to the addressed subscriber. If the e-mail is not statistically determined to be spam, the process 200 moves to block 222 where the e-mail is stored for delivery to the addressed recipient(s) that is(are) serviced by the ISP. At block 224, a user makes a demand to retrieve the e-mail stored by the ISP and the e-mail is retrieved. At block 226, the user views a display of the e-mail.

A spammer can develop a dictionary attack spam e-mailing so as to avoid detection by taking precautions as to the way that the user IDs are generated. In one implementation, a generation of logically columnized user IDs is made. A numerical expression is derived for the degree of repetition of the most common character for each column. A weighting is then applied to the numerical expression for each column by a respective weight for each column to obtain respective weighted column values. Here, the respective weight for each column is selected such that the sum of the weighted column values is equal to a confidence level of about 100 percent (100%) when the user IDs are identical. If the confidence level is above a predetermined percentage, the deriving and weighting steps are repeated using an alteration of the user IDs until the confidence level is below the predetermined percentage. This predetermined percentage is set by the spammer to be a number that the spammer suspects will enable the generated and altered list of user IDs to avoid detection by an ISP's algorithm that will otherwise thwart dictionary attack e-mail deliveries. The altered list of User IDs are less likely to be valid e-mail addresses since an unaltered dictionary attack list is designed to create the most common User IDs. As such, the spammer's alterations to the dictionary attack list would best be designed not only to avoid detection by the ISP's algorithm but also to take into consideration likely criteria for valid e-mail addresses so that the spammer's altered list of User IDs would be more likely to be valid for e-mail addresses than not.

Once the confidence level is below the predetermined percentage, the generated and altered list of user IDs are divided into respective groups. For each group, an e-mail is formed. The e-mail is addressed to an e-mail address for each respective e-mail address for each user ID in the group. Each e-mail should be addressed to not more than a predetermined maximum number of e-mail addresses (e.g., not more than fifty) such as is a common requirement of typical ISPs. As such, each group should contain not more that this predetermined maximum number of the generated and altered list of user IDs. Once the dictionary attack e-mails have been properly formed, they can then be transmitted to respective addresses to which they are addressed.

A Computer System

Figure 4:
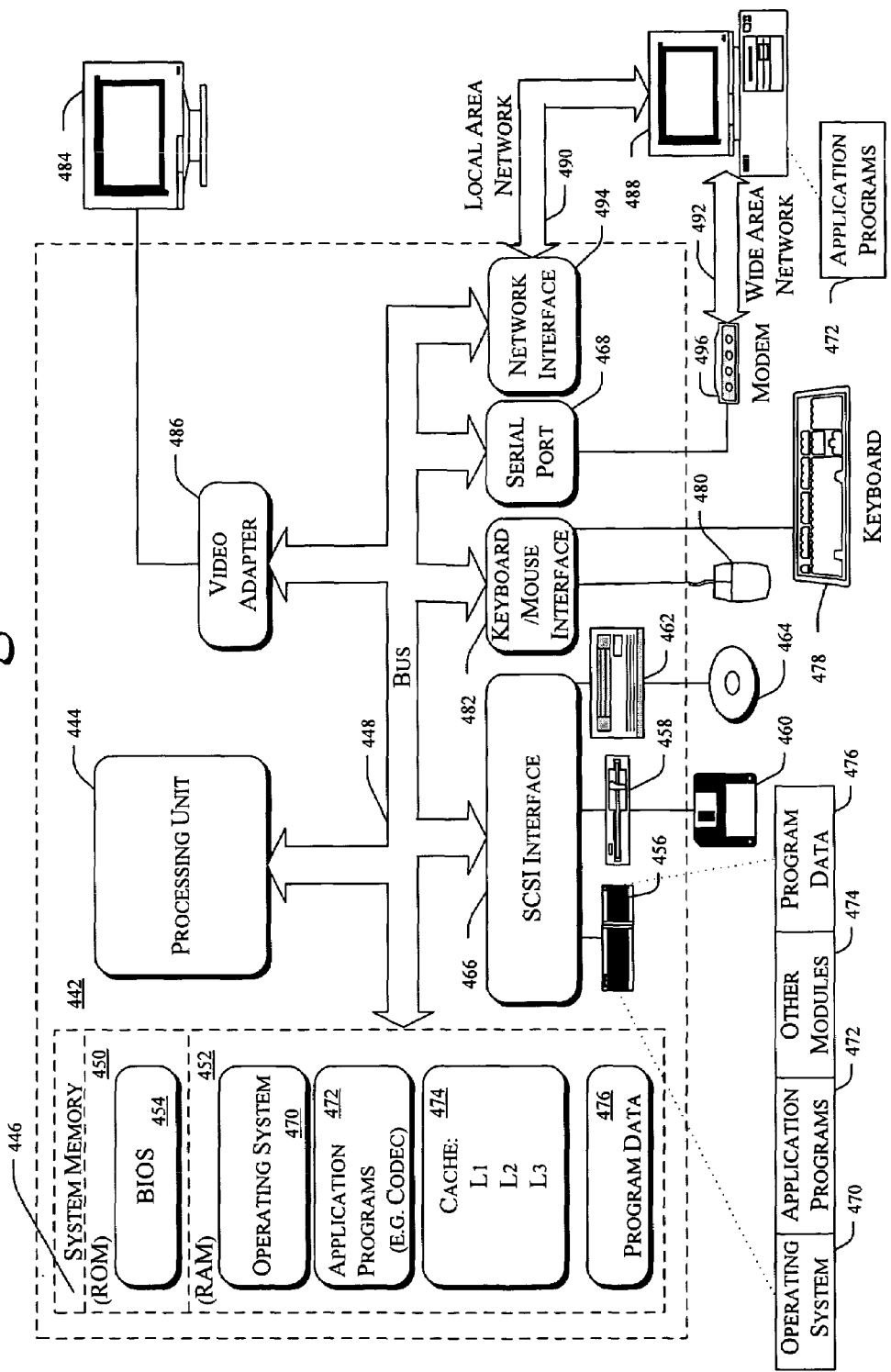
FIG. 4 is a block diagram, in accordance with an implementation, of a networked computer that can be used to implement either a server or a client a shown in FIG. 1.

FIG. 4 shows an exemplary computer system that can be used in the implementations described herein, where a computer 442 can perform a portion or all of the functions of any of the servers and/or client machines seen in FIG. 1. Computer 442 includes one or more processors or processing units 444, a system memory 446, and a bus 448 that couples various system components including the system memory 446 to processors 444. The bus 448 represents one or more of any of several types of bus structures, including a memory bus or memory controller, a peripheral bus, an accelerated graphics port, and a processor or local bus using any of a variety of bus architectures. The system memory 446 includes read only memory (ROM) 450 and random access memory (RAM) 452. A basic input/output system (BIOS) 454, containing the basic routines that help to transfer information between elements within computer 442, such as during start-up, is stored in ROM 450. Computer 442 further includes a hard disk drive 456 for reading from and writing to a hard disk (not shown), a magnetic disk drive 458 for reading from and writing to a removable magnetic disk 460, and an optical disk drive 462 for reading from or writing to a removable optical disk 464 such as a CD ROM or other optical media. The hard disk drive 456, magnetic disk drive 458, and optical disk drive 462 are connected to the bus 448 by an SCSI interface 466 or some other appropriate interface. The drives and their associated computer-readable media provide non-volatile storage of computer-readable instructions, data structures, program modules and other data for computer 442. Although the exemplary environment described herein employs a hard disk, a removable magnetic disk 460 and a removable optical disk 464, it should be appreciated by those skilled in the art that other types of computer-readable media which can store data that is accessible by a computer, such as magnetic cassettes, flash memory cards, digital video disks, random access memories (RAMs), read only memories (ROMs), and the like, may also be used in the exemplary operating environment.

A number of program modules may be stored on the hard disk 456, magnetic disk 460, optical disk 464, ROM 450, or RAM 452, including an operating system 470, one or more application programs 472 (such as a design application), other program modules 474, and program data 476. A user may enter commands and information into computer 442 through input devices such as a keyboard 478 and a pointing device 480. Other input devices (not shown) may include a microphone, joystick, game pad, satellite dish, scanner, or the like. These and other input devices are connected to the processing unit 444 through an interface 482 that is coupled to the bus 448. A monitor 484 or other type of display device is also connected to the bus 448 via an interface, such as a video adapter 486. In addition to the monitor, personal computers typically include other peripheral output devices (not shown) such as speakers and printers.

Computer 442 commonly operates in a networked environment using logical connections to one or more remote computers, such as a remote computer 488. The remote computer 488 may be another personal computer, a server, a router, a network PC, a peer device or other common network node, and typically includes many or all of the elements described above relative to computer 442. The logical connections depicted in FIG. 4 include a local area network (LAN) 490 and a wide area network (WAN) 492. Such networking environments are commonplace in offices, enterprise-wide computer networks, intranets, and the Internet. When used in a LAN networking environment, computer 442 is connected to the local network through a network interface or adapter 494. When used in a WAN networking environment, computer 442 typically includes a modem 496 or other means for establishing communications over the wide area network 492, such as the Internet. The modem 496, which may be internal or external, is connected to the bus 448 via a serial port interface 468. In a networked environment, program modules depicted relative to the personal computer 442, or portions thereof, may be stored in the remote memory storage device. It will be appreciated that the network connections shown are exemplary and other means of establishing a communications link between the computers may be used.

Generally, the data processors of computer 442 are programmed by means of instructions stored at different times in the various computer-readable storage media of the computer. Programs and operating systems are typically distributed, for example, on floppy disks or CD-ROMs. From there, they are installed or loaded into the secondary memory of a computer. At execution, they are loaded at least partially into the computer's primary electronic memory. The system described herein includes these and other various types of computer-readable storage media when such media contain instructions or programs for implementing the blocks described, in conjunction with a microprocessor or other data processor. The system described can also include the computer itself when programmed according to the methods and techniques described herein.

For purposes of illustration, programs and other executable program components such as the operating system are illustrated herein as discrete blocks, although it is recognized that such programs and components reside at various times in different storage components of the computer, and are executed by the data processor(s) of the computer.

CONCLUSION

Implementations enable the identification of dictionary attack e-mail, as well as avoiding the detection of the same. Savings of cost, time, and network bandwidth are made possible by one or more of the implementations.

Although the invention has been described in language specific to structural features and/or methodological acts, it is to be understood that the invention defined in the appended claims is not necessarily limited to the specific features or acts described. Rather, the specific features and acts are disclosed as exemplary forms of implementing the claimed invention.

What is claimed is:

1. A method comprising:
    assessing the similarity of addresses to which an e-mail is addressed wherein the assessment comprises assessing the similarity of the user IDs of the addresses wherein the assessment of the similarity of the user IDs is weighted heavier for the leftmost characters of the User IDs than for the rightmost characters of the User IDs, the weight decreasing from left to right for each character of the user IDs wherein differences in weight between the character positions is non-linear; and
    deriving a spam value from the assessment.

2. The method as defined in claim 1, further comprising:
    analyzing the likelihood that the e-mail is spam; and
    determining the e-mail to be spam when the analysis finds that the e-mail is likely to be spam and the spam value exceeds a predetermined threshold.

3. The method as defined in claim 2, wherein the analyzing comprises one or more tests which evaluate the likelihood that the e-mail is spam.

4. A computer readable medium comprising instructions that, when executed by a computer, performs the method of claim 1.

5. A method comprising:
    columnizing, in left-to-right order, the characters in the respective user IDs in a plurality of addresses to which an electronic mail (e-mail) is addressed;
    for each said column:
        counting the highest number of identical characters to arrive at a repeat total for the column;
        dividing the repeat total by the number of addresses to which the e-mail is addressed to arrive at a quotient; and
        weighting the quotient by a factor according to the relative left-to-right order of the column to arrive at a weighted quotient;
    summing the weighted quotients for the columns to arrive at a first spam value.

6. The method as defined in claim 5, wherein the weighted quotient comprises the quotient multiplied by the factor.

7. The method as defined in claim 5, wherein:
    the weighted quotient comprises the quotient multiplied by the factor;
    the factor comprises $W(c)$; and
    $W(c)$ comprises $\ln((n+(c+1)(e-1))/(n+c(e-1)))$; wherein:
        n comprises the number of characters in the longest user ID of the addresses to which the e-mail is addressed;
    c comprises the relative left-to-right number of the column; and
    e is the Euler number constant.

8. The method as defined in claim 7, wherein the c is equal to zero for the first column in the left-to-right order.

9. The method as defined in claim 7, wherein n is not more than 72.

10. The method as defined in claim 5, further comprising, prior to the columnizing, obtaining the user ID for each said address by parsing the characters thereof in order from the left-to-right prior to the occurrence of an "@" character.

11. The method as defined in claim 5, wherein each said quotient has a value not less than zero and not more than one.

12. The method as defined in claim 5, wherein the addresses are included in either a "to" field or a "cc" field of the e-mail.

13. The method as defined in claim 5, wherein a count of the number of addresses is not more than fifty.

14. The method as defined in claim 5, wherein the first spam value is a confidence level assessment as to whether the e-mail was sent incident to a spammers dictionary attack.

15. The method as defined in claim 5, further comprising performing the columnizing and the summing prior to sending the e-mail to any said address to which the e-mail is addressed.

16. The method as defined in claim 5, further comprising, prior to the columnizing and the summing, receiving the e-mail at an e-mail service provider address that is used in conjunction with an e-mail service provider that provides e-mail services to one or more of the addresses to which the e-mail is addressed.

17. The method as defined in claim 5, further comprising, when the number of characters in the user ID of any said address is greater than a predetermined number:
    skipping the columnizing and the summing; and
    sending the e-mail to the addresses to which the e-mail is addressed.

18. The method as defined in claim 5, wherein each said address comprises:
    the user ID prior to a leftmost @ character;
    an optional machine/sub-machine name after a period character that follows the user ID;
    a domain name after a period character that follows either the user ID or the optional machine/sub-machine name;
    a top level domain after a period character that follows the domain name; and
    an optional sequence of country code characters after a period character that follows the top level domain name.

19. A computer readable medium comprising instructions that, when executed by a computer, perform the method of claim 5.

20. A method comprising, for each of a plurality of untransmitted e-mails, the steps of:
    (a) columnizing, in left-to-right order, the characters in the respective user IDs in a plurality of addresses to which the untransmitted e-mail is addressed;
    (b) for each said column:
        counting the highest number of identical characters to arrive at a repeat total for the column;
        dividing the repeat total by the number of addresses to which the untransmitted e-mail is addressed to arrive at a quotient; and
        weighting the quotient by a factor according to the relative left-to-right order of the column to arrive at a weighted quotient;
    (c) summing the weighted quotients for the columns to arrive at a first spam value;
    (d) altering one or more of the user IDs in the addresses to which the untransmitted e-mail is addressed; and
    (e) repeating the steps (a) through (d) until the first spam value is outside of a predetermined range of values.

21. The method as defined in claim 20, further comprising generating the plurality of untransmitted e-mails each of which is spam, whereby step (e) can assist in avoiding a detection of a spam dictionary attack.

22. A computer readable medium comprising instructions that, when executed by a computer, perform the method of claim 20.

23. A method comprising:
    columnizing, in left-to-right order, the characters in the respective user IDs in a plurality of addresses to which an e-mail is addressed;
    for each said column:
        counting the highest number of identical characters to arrive at a repeat total for the column;
        dividing the repeat total by the number of addresses to which the e-mail is addressed to arrive at a quotient; and weighting the quotient by a factor according to the relative left-to-right order of the column to arrive at a weighted quotient;

summing the weighted quotients for the columns to arrive at a first confidence level assessment as to whether the e-mail is spam;

performing one or more other confidence level assessments that each assess whether the e-mail is spam;

using each of the first and other confidence level assessments to arrive at a final spam value; and determining, based upon the final spam value, whether to deliver the e-mail to any said address.

24. The method as defined in claim 23, wherein the one or more other confidence level assessments includes determining that the number of characters in the user ID of any said address is greater than a predetermined number.

25. The method as defined in claim 23 wherein the one or more other confidence level assessments includes identifying a subject field for the e-mail any of a plurality of predetermined key words, characters, or character strings.

26. The method as defined in claim 23, wherein the one or more other confidence level assessments includes a count of the number of addresses exceeding a predetermined maximum.

27. The method as defined in claim 23, further comprising:
weighting each of the first and other confidence level assessments that assess whether the e-mail is spam; and
arriving at a final spam value using the weighted confidence level assessments.

28. The method as defined in claim 27, further comprising preventing, based upon the final spam value and a sent-from address of the e-mail, the delivery of any other e-mail that is received from the sent-from address of the e-mail.

29. The method as defined in claim 27, further comprising determining, based upon the final spam value, whether to deliver the e-mail to each said address.

30. The method as defined in claim 27, further comprising delivering the e-mail to each said address when the final spam value is beneath a predetermined confidence level.

31. A computer readable medium comprising instructions that, when by a computer, perform the method of claim 23.

32. For the user IDs in a plurality of addresses to which an e-mail is addressed, the user IDs being logically ordered into a two dimensional (2D) matrix of rows each having one said user ID, a method comprising:
for each column in the 2D matrix:
finding a column count by counting the highest number of matching characters in the column;
calculating a column quotient by dividing the column count by the total number of rows in the 2D matrix; and
calculating a weighted column quotient by multiplying the column quotient by a weight that is based on the left-to-right order of the column in the 2D matrix;
calculating a numerical assessment of the similarity of the user IDs in the plurality of addresses to which the e-mail is addressed by adding up the weighted column quotients for the columns in the 2D matrix.

33. The method as defined in claim 32, wherein the weight for each respective said column in the 2D matrix comprises $\ln((n+(c+1)(e-1))/(n+c(e-1)))$; wherein:
n comprises the number of characters in the longest user ID in the matrix;
c comprises the number of the relative left-to-right order of the column; and
e is the Euler number constant.

34. The method as defined in claim 33, wherein the c is equal to zero for the first column in the left-to-right order.

35. The method as defined in claim 32, wherein the numerical assessment is a confidence level assessment as to whether the e-mail was sent incident to a spammer's dictionary attack.

36. The method as defined in claim 32, further comprising performing the finding and each said calculating prior to sending the e-mail to any said address to which the e-mail is addressed.

37. The method as defined in claim 32, further comprising, prior to the finding and each said calculating, receiving the e-mail at an e-mail service provider address that is used in conjunction with an e-mail service provider that provides e-mail services to one or more of the addresses to which the e-mail is addressed.

38. A computer readable medium comprising instructions that, when executed by a computer, perform the method of claim 32.

39. A method comprising, for each of a plurality of untransmitted e-mails, the steps of:
for the user IDs in a plurality of addresses to which the untransmitted e-mail is addressed, the user IDs being logically ordered into a two dimensional (2D) matrix of rows each having one said user ID, for each column in the 2D matrix:
(i) finding a column count by counting the highest number of matching characters in the column;
(ii) calculating a column quotient by dividing the column count by the total number of rows in the 2D matrix;
(iii) calculating a weighted column quotient by multiplying the column quotient by a weight that is based on the left-to-right order of the column in the 2D matrix;
(iv) calculating a numerical assessment of the similarity of the user IDs in the plurality of addresses to which the e-mail is addressed by adding up the weighted column quotients for the columns in the 2D matrix,
(v) altering one or more of the user IDs in the addresses to which the untransmitted e-mail is addressed; and
(vi) repeating the steps (i) through (v) until the numerical assessment is outside of a predetermined range of values.

40. The method as defined in claim 39, further comprising generating the plurality of untransmitted e-mails each of which is spam, whereby step (vi) can assist in avoiding a detection of a spam dictionary attack.

41. A computer readable medium comprising instructions that, when executed by a computer, perform the method of claim 39.

42. For the user IDs in a plurality of addresses to which an e-mail is addressed, the user IDs being logically ordered into a two dimensional (2D) matrix of rows each having one said user ID, a method comprising:
for each column in the 2D matrix:
finding a column count by counting the highest number of matching characters in the column;
calculating a column quotient by dividing the column count by the total number of rows in the 2D matrix; and
calculating a weighted column quotient by multiplying the column quotient by a weight that is based on the left-to-right order of the column in the 2D matrix;
calculating a first confidence level assessment as to whether the e-mail is spam by adding up the weighted column quotients for the columns in the 2D matrix;

performing one or more other confidence level assessments that each assess whether the e-mail is spam;

using each of the first and other confidence level assessments to arrive at a final spam assessment; and determining, based upon the final spam assessment, whether to deliver the e-mail to any said address.

43. The method as defined in claim 42, further comprising assessing, based upon the final spam assessment and a sent-from address of the e-mail, whether to prevent the delivery of any other e-mail that is received from the sent-from address of the e-mail.

44. The method as defined in claim 42, wherein the one or more other confidence level assessments are selected from the group consisting of:

determining that the number of characters in the user ID of any said address is greater than a predetermined number;

identifying in a subject field for the e-mail any of a plurality of predetermined key words, characters, or character strings; and a count of the number of addresses exceeding a predetermined maximum.

45. The method as defined in claim 42, further comprising including a weighting factor in any of the first and other confidence level assessments, wherein each said weighting factor represents the relative significance of the respective confidence level assessment in which the weighting factor is included.

46. A computer readable medium comprising instructions that, when executed by a computer, perform the method of claim 42.

47. A method comprising the steps, for each of a plurality of untransmitted e-mails:

(a) performing the method of claim 46 upon the untransmitted e-mail to thereby calculate the first confidence level assessment thereof; and (b) altering one or more of the user IDs in the addresses to which the untransmitted e-mail is addressed; and (c) repeating steps (a) and (b) until the first confidence level assessment is outside of a predetermined range of values.

48. The method as defined in claim 47, further comprising generating the plurality of untransmitted e-mails each of which is spam, whereby step (c) can assist in avoiding a detection of a spam dictionary attack.

49. A computer readable medium comprising instructions that, when executed by a computer, perform the method of claim 47.

50. A method comprising:

for the respective user IDs in a plurality of addresses to which an e-mail is addressed, where the characters of the respective user IDs are logically and collectively columnized, deriving a numerical expression of the degree of repetition of the most common character for each column; and weighting the numerical expression for each column by a respective weight for each column to obtain respective weighted column values, wherein the respective weight for each column is selected such that the sum of the weighted column values is equal to a confidence level of about 100 percent (100%) when the user IDs in the plurality of addresses are identical.

51. The method as defined in claim 50, further comprising:

altering one or more of the user IDs in the addresses to which the e-mail is addressed; and repeating the deriving, weighting and altering until the confidence level is below a predetermined percentage.

52. The method as defined in claim 51, wherein the e-mail is untransmitted, and the method further comprises:

generating a plurality of the untransmitted e-mails; and performing the repeating for each said untransmitted e-mail.

53. The method as defined in claim 52, further comprising transmitting each of the untransmitted e-mails to the respective addresses therein.

54. A computer readable medium comprising instructions that, when executed by a computer, performs the method of claim 50.

55. A method comprising:

generating logically columnized user IDs;

deriving a numerical expression of the degree of repetition of the most common character for each column;

weighting the numerical expression for each column by a respective weight for each column to obtain respective weighted column values, wherein the respective weight for each column is selected such that the sum of the weighted column values is equal to a confidence level of about 100 percent (100%) when the user IDs are identical;

if the confidence level is above a predetermined percentage, repeating the deriving and weighting using an alteration of the user IDs until the confidence level is below the predetermined percentage;

dividing the user IDs into respective groups; and for each group, forming an e-mail and a respective e-mail address for each user ID in the group.

56. The method as defined in claim 55, further comprising transmitting the e-mails to the respective addresses therein.

57. The method as defined in claim 55, wherein the user IDs are generated incident to a dictionary spam attack.

58. A computer readable medium comprising instructions that, when executed by a computer, performs the method of claim 55.

* * * * *